(12) United States Patent
Katayama

(10) Patent No.: US 6,254,022 B1
(45) Date of Patent: Jul. 3, 2001

(54) REEL BODY OF DOUBLE BEARING REEL

(75) Inventor: Hitoshi Katayama, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 09/500,692

(22) Filed: Feb. 9, 2000

(30) Foreign Application Priority Data

Feb. 22, 1999 (JP) .................................................. 11-043428

(51) Int. Cl.$^7$ .................................................. A01K 89/00
(52) U.S. Cl. .......................................... 242/310; 242/316
(58) Field of Search ................................. 242/310, 312, 242/316

(56) References Cited

U.S. PATENT DOCUMENTS

| | | | |
|---|---|---|---|
| 5,108,042 | * | 4/1992 | Puryear et al. ...................... 242/288 |
| 5,480,102 | * | 1/1996 | Sato ...................................... 242/310 |
| 5,799,892 | * | 9/1998 | Sato ...................................... 242/310 |
| 5,897,069 | * | 4/1999 | Brown et al. ........................ 242/310 |

* cited by examiner

Primary Examiner—Katherine A. Matecki
(74) Attorney, Agent, or Firm—Shinjyu Intellectual Property Firm

(57) ABSTRACT

A reel body (1) of a double bearing reel includes a pair of side plates (10) and (11), two connecting members (12a and 12b), and a fishing rod installation portion (4). The pair of side plates define a cylindrically shaped space there between and have respective circumferential outer surfaces formed by lathe cutting work with a radius (R1) about a first centering axis (01) so as have a circular shape. The upper connecting member (12a) connects the pair of side plates and a portion (12C) of a radially outer surface of the upper connecting member is provided with an arcuate shape formed by lathe cutting work having a radius (R2) about a second centering axis (02). The fishing rod installation portion 4 extends in the longitudinal direction of the fishing rod and is integrally formed with a portion of a lower connecting member (12b).

5 Claims, 4 Drawing Sheets

REEL BODY OF DOUBLE BEARING REEL

BACKGROUND OF THE INVENTION

1. Field of the Invention

This invention relates to a reel body of a double bearing reel. More specifically, the present invention relates to a reel body of a round-shape double bearing reel that is mountable on a fishing rod and is configured to receive a fishing line wound around spool therein about a first axis perpendicular to the fishing rod.

2. Background Information

In general, a double bearing reel includes a reel body, a spool, a handle, and a rotation transmitting means. The reel body is attached to a fishing rod. The spool is rotatably supported in the reel body. The handle is disposed at one side of the reel body to rotate the spool. The rotation transmitting means transmits the rotation of the handle to the spool such that a fishing line may be draw in and wound around the spool. The reel body includes a pair of right and left side plates, a reel frame, and a pair of right and left side covers. The reel frame includes a pair of connecting members for connecting the right side plate with the left side plate. Each of the pair of right and left side covers covers corresponding sides of the reel frame. The connecting members are integrally formed with edge portions of the side plates and a fishing rod installation portion is provided with one of the connection member to attach the reel to the fishing rod.

Configurations of such a double bearing reel are known where a reel has a round shaped and is made of metal and where the reel body has a circular shape viewed from a side thereof. The round shaped reel has side covers and reel frame that are generally made by, for instance, a die-cast method or a forging method. Each of the pair of the side plates and the side covers have a circular shape viewed from the side and the outer surface of the reel body including, the connecting members, are subjected to cutting work typically by a lathe during the manufacturing process. As a result, the reel has a highly decorative and classy appearance.

A fishing rod installation portion is provided with this type of metallic reel body for mounting on the fishing rod. The fishing rod installation portion is fixed to the connecting members by caulking or bolting. Installation of the fishing rod installation portion occurs after manufacturing and cutting using a lathe of the various parts of the reel body because the installation portion does not have an outline that conforms to the circular or round shape of the reel body. In other words, the fishing rod installation portion cannot typically subjected to cutting work using a lathe together with the reel body.

As mentioned above, a conventional fishing rod installation portion for a round shaped reel having a metallic reel body is joined to the connecting member by caulking or using screws defining a joint portion. When the reel is attached to the fishing rod, a large force is applied to the joint portion when a fish is caught. Thus, sufficient strength is required at the joint portion to withstand the forces imparted by the fish. In order to obtain sufficient strength, it is necessary to increase the thickness of the portions defining the joint portion and, hence, it is difficult to reduce the weight of the reel or reduce the height dimensions of the upper portion of the reel body relative to the fishing rod (hereinafter referred to as a "low profile.") Also, since an additional member (the reel installation portion) attached to the reel body is used at the joint portion, it is difficult to obtain a classy, appealing appearance at the joint portion.

SUMMARY OF THE INVENTION

Accordingly, an object of the present invention is to provide a reel body with a round shape that has a high-class appearance and has a low profile relative to the fishing rod.

In accordance with one aspect of the present invention, a reel body of a double bearing reel is attachable to a fishing rod. The reel body supports a spool that is rotatable about a rotational axis for winding a fishing line, the rotational axis being generally perpendicular to a longitudinal length of the fishing rod. The reel body includes a pair of side plates, the side plates having a generally circular shape having a radius R1 formed by cutting work about a first centering axis that is offset from the rotational axis. A plurality of connecting members rigidly connect the side plates. The connecting members are spaced apart from one another such that the spool is positionable between the side plates. A fishing rod installation portion extends in a direction generally perpendicular to the rotational axis and is formed integrally with a portion of one of the plurality of connecting members. An outer surface of one of the plurality of connecting members has a radial outer surface having at least a portion thereof formed with an arcuate shape formed by cutting work. The arcuate shape of the portion of the radial outer surface has a radius R2 with a center located on a second centering axis that is parallel to the first centering axis. The second centering axis is located closer to the fishing rod installation portion than the first centering axis and the rod installation portion is confined within a cylindrically shaped space defined by the radius R2 about the second centering axis.

Preferably, a difference in length between the radius R1 and radius R2 is smaller than the distance between the first centering axis and the second centering axis.

Preferably, the reel body also includes a pair of side covers for covering a respective outside of the pair of side plates.

Preferably, the side covers each have a circular shape having a radius of R1.

Preferably, the rod installation portion and the one of the plurality of connecting members are spaced apart from a lower radial outer edge of the side plates such that the fishing rod extends within a cylindrical space defined between the side plates in response to attachment of the fishing rod to the rod installation portion.

According to the present invention, the fishing rod installation portion is integrally formed with one of the plurality of the connecting members. Also, the surface of the middle portion of the connecting member is subjected to cutting work so as to have an arcuate shape with a center on the second centering axis located closer to the fishing rod installation portion than the first centering axis and the surfaces of the side plates of the reel frame are circular shaped and formed by cutting work about the first centering axis. Since the surface of the middle portion is subjected to a cutting work so as to have an arcuate shape about the second centering axis, it is possible to place the fishing rod installation portion within the circle defined by the radius R2 having a center on the second centering axis. For this reason, the fishing rod installation portion may be integrally formed with the connecting member and still permit subjecting the outer surface of the connecting member to cutting work by a lathe. Because the fishing rod installation portion may be integrally formed with the connecting member, it becomes possible, while maintaining the strength, to reduce the thickness and weight of the joint portion as compared with a case in which a separate member is used creating a joint portion. As a result, a low profile is achieved in the reel of the present invention. Moreover, it becomes easy to obtain a high-class appearance since the fishing rod installation portion is integrally formed and the outer surface of the connecting member may be subjected to cutting work.

In the present invention, the difference in length between the radii R1 and R2 is less than the distance between the first and second centering axis. Therefore, there is an intersection between circles with radii R1 and R2 drawn about the first and second centering axis, respectively. It is therefore possible to reduce a difference in level between the surfaces on the connecting member having arcuate surfaces, portions of the arcuate surface cut about the first centering axis with radius R1 and another portion of the surface having an arcuate contour cut about the second centering axis with radius R2. Accordingly, the difference in level between the portions surface of the connecting portion my be chosen to be hardly noticeable or may be made more prominent.

These and other objects, features, aspects and advantages of the present invention will become apparent to those skilled in the art from the following detailed description, which, taken in conjunction with the annexed drawing, discloses a preferred embodiment of the present invention.

BRIEF DESCRIPTION OF THE DRAWINGS

Referring now to the attached drawing which forms a part of this disclosure.

DETAILED DESCRIPTION OF THE PREFERRED EMBODIMENT

Figure 1:
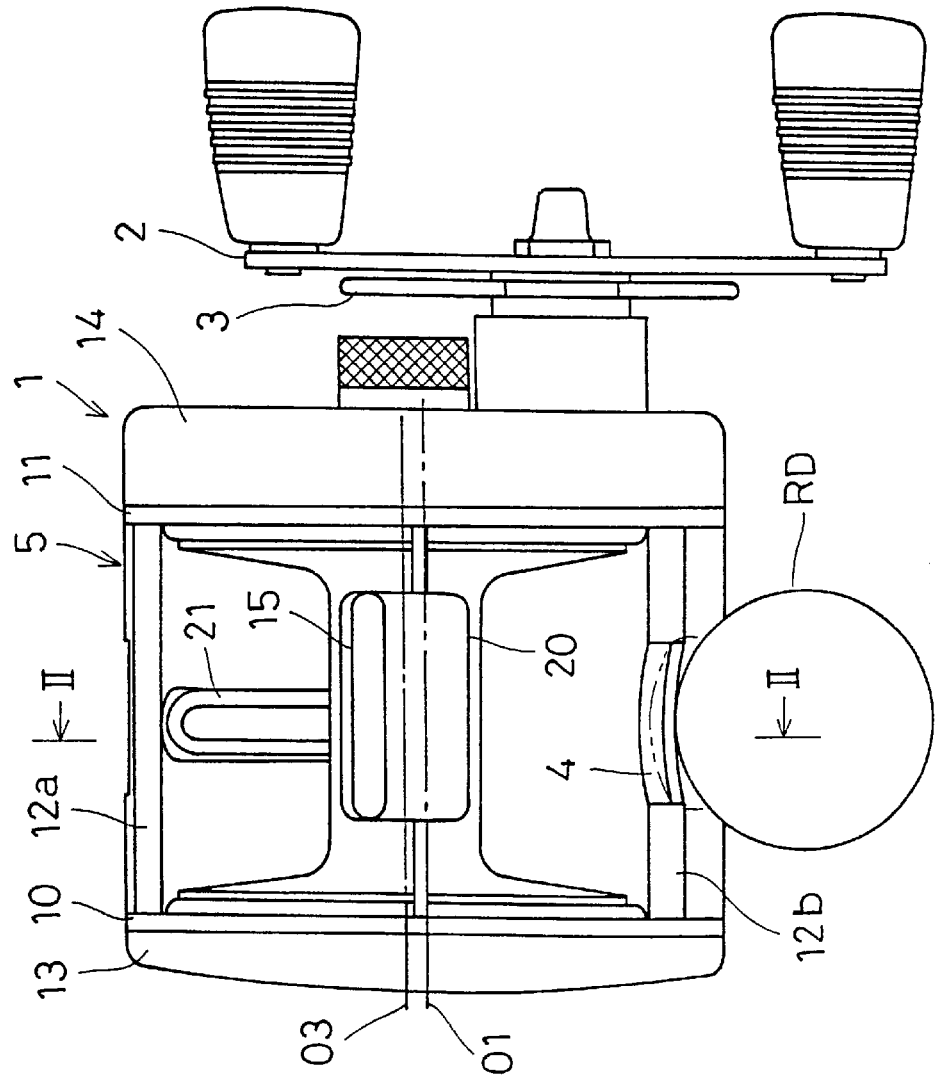
FIG. 1 is a back end view of a double bearing fishing reel in accordance with one embodiment of the present invention, with the fishing reel mounted on a fishing rod.
Figure 2:
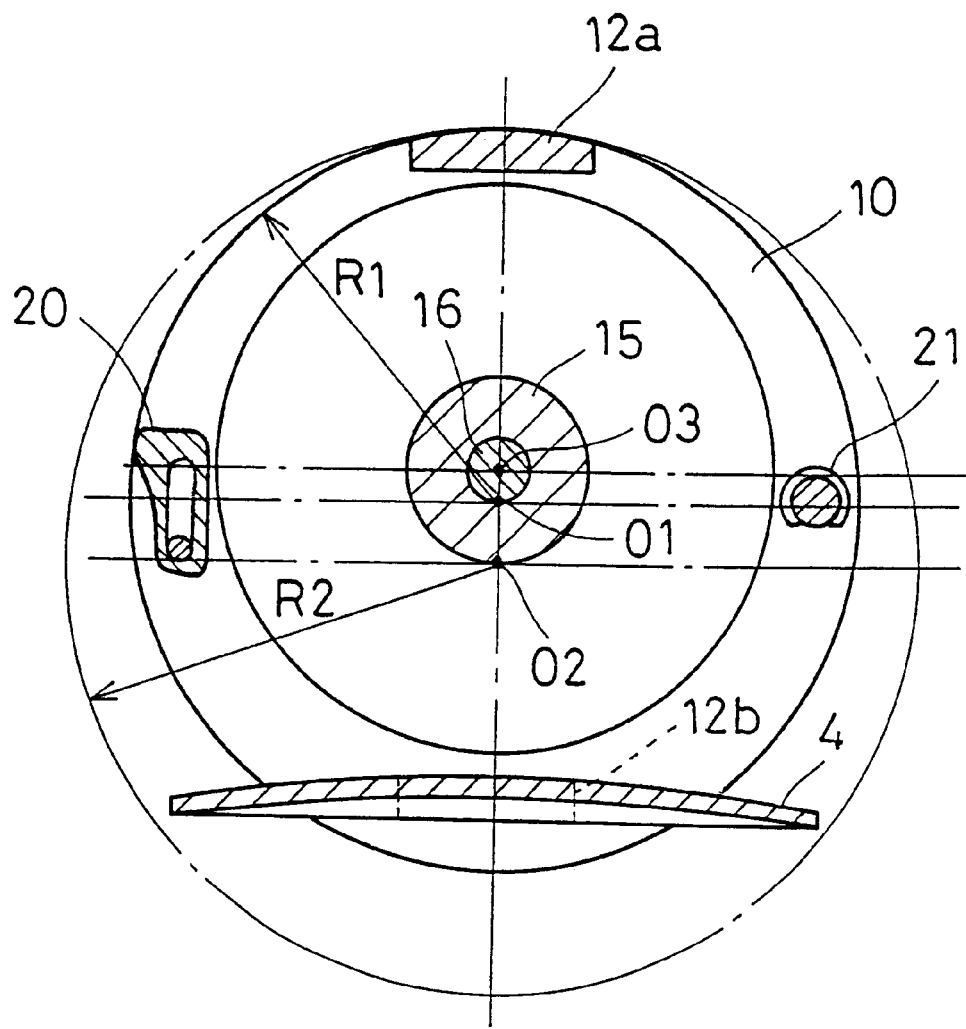
FIG. 2 is a cross-sectional view of the fishing reel taken along the line II—II in FIG. 1.

FIG. 1 shows a double bearing reel in accordance with one embodiment of the present invention. The double bearing reel has a substantially circular shape viewed from the side, as shown in FIG. 2. The round shaped reel includes a reel body 1, a handle 2, and a star drag 3. The handle 2 is provided for rotating a spool 15 and is disposed at one side of the reel body 1. The star drag 3 is disposed at the reel body side of the handle 2. The spool 15 is rotatably provided within the reel body 1. The reel body 1 may be attached to a fishing rod RD via a fishing rod installation portion 4.

As shown in FIG. 1, the reel body 1 includes a reel frame 5, a first side cover 13, and a second cover 14. The first side cover 13 and the second cover 14 are attached to opposite respective sides of the reel frame 5.

Figure 3:
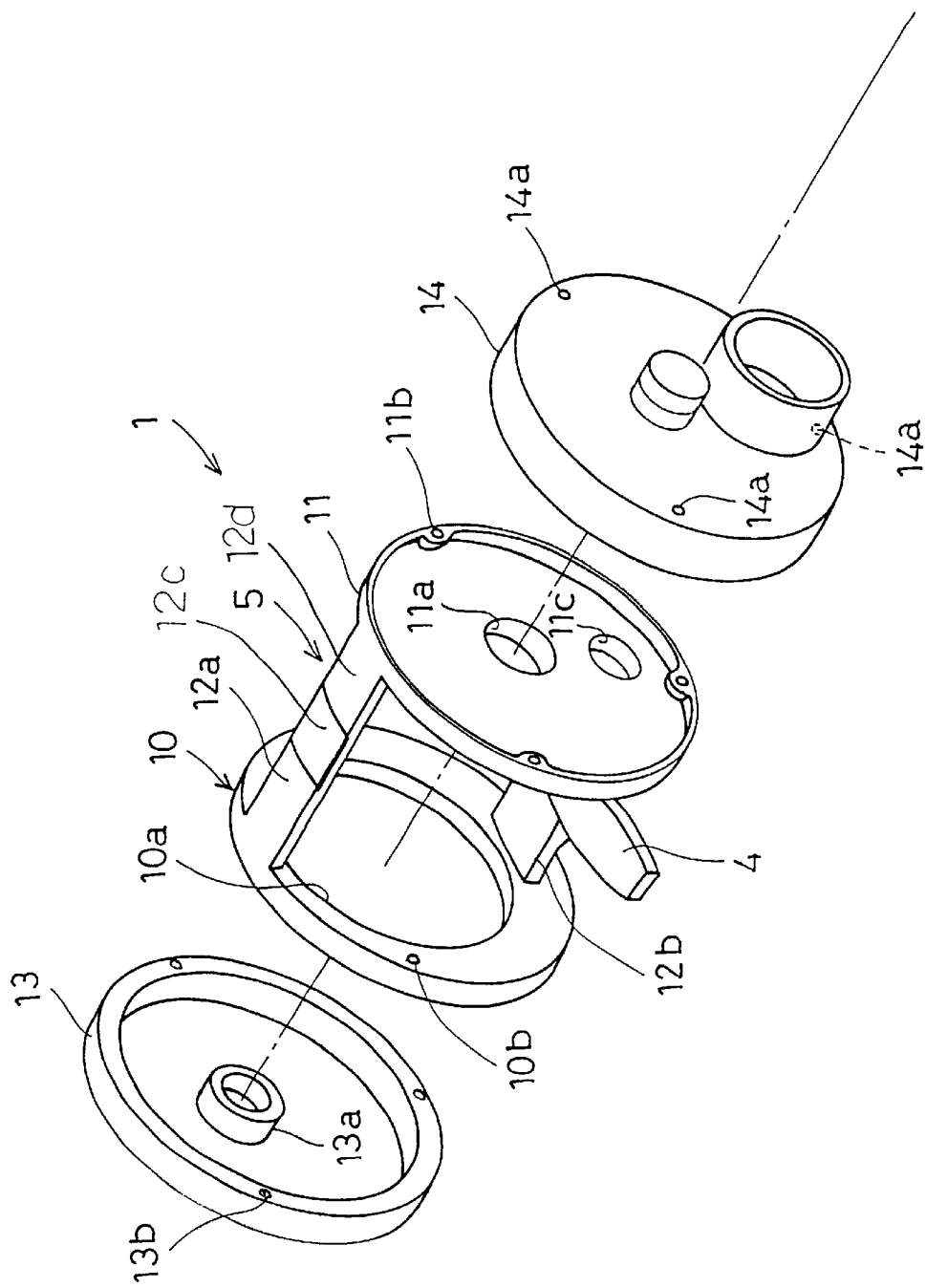
FIG. 3 is an perspective exploded view of a reel body of the fishing reel depicted in FIG. 1.

The reel frame 5 itself is formed by any of a variety of process, for instance, by forge molding an aluminum alloy. As shown in FIGS. 1, 2 and 3, the spool 15 is disposed (and supported) within the reel frame 5 between a pair of right and left side plates 10 and 11 of the reel frame 5. The reel frame 5 also includes a pair of connecting members 12a and 12b that extend between the right and left side plates 10 and 11 providing rigid support therebetween. Each of the right and left side plates 10 and 11 is disposed with a predetermined space therebetween in an axial direction relative to the spool 15, the predetermined space being in the shape of a cylinder between the side plates 10 and 11. The right and left side plates 10 and 11 are connected to opposite ends, respectively, of the connecting members 12a and 12b. The outer surfaces of the parts above mentioned parts of the reel frame 5 are subjected to cutting work using a lathe to achieve the depicted shapes, as is described in greater detail below.

As shown in FIG. 2, the side plate 10 is a ring shaped member whose circumference has a radius R1 and a first centering axis 01 as its center. At a central portion of the side plate 10 there is an off center hole 10a that is off-center in an upward direction with respect to the center (first centering axis 01) of the side plate 10. The off center hole 10a is positioned to correspond to the location where the spool 15 is disposed. During assembly of the reel, the spool may be inserted through the off-center hole 10a. The off-center hole 10a has a circular shape that is centered about a third centering axis 03 located just above the first centering axis 01, as shown in FIG. 2. Three screw holes 10b, each open toward an outer side of the reel frame 5, are formed on the outer surface of the side plate 10 at circumferentially spaced apart positions.

The side plate 11 is a disk shaped member whose circumference has a radius R1 and, after installation on the side plate 10, has a center that is aligned with the first centering axis 01. At a central portion of the side plate 11, a penetrating hole 11a is formed. The center of the side plate 11 is aligned with the first centering axis 01 and the penetrating hole 11a is located off center in an upwardly direction from the center of the side plate 11. The penetrating hole 11a provides a support through which a spool shaft 16 (see FIG. 2) of the spool 15 is extendable. A space is provided between the side plate 11 and the second side cover 14 so that a gear mechanism (not shown) such as gears of a rotation transmitting mechanism (not shown) for transmitting the rotation of the handle 2 to the spool 15 may be installed. The periphery of the side plate 11 is trimmed and three circumferentially spaced apart screw holes 11b on an outer side thereof are provided. A hole 11c for supporting a rotational shaft (not shown) of the handle 2 is provided below the penetrating hole 11a.

The connecting members 12a and 12b connect the pair of the side plates 10 and 11 at, for example, upper and lower portions of the reel body 1, as shown in FIGS. 2 and 3. The upper connecting member 12a is depicted connecting the side plates 10 and 11 at outer periphery portions thereof and the lower connecting member 12b is depicted connecting the side plates 10 and 11 at portions located more inwardly with respect to the outer periphery portions. However, the connecting members 12a and 12b may be connected to the side plates 10 and 11 at alternate locations so long as there is no interference with the rotation of the spool 15.

The fishing rod installation portion 4 is integrally formed with the lower connecting member 12b. The fishing rod installation portion 4 is a plate-shaped portion generally perpendicular to the axis of rotation (aligned with the third centering axis 03) of the spool 15 but is formed with a slight curvature extending back and forward from the center of the connecting member 12b as shown in FIG. 2. The fishing rod installation portion 4 is also curved in an arc shape in the right to left direction as shown in FIG. 1. The right to left direction curvature conforms generally to the shape of a corresponding installation portion of the fishing rod RD. The fishing rod installation portion 4 is formed together with the lower connecting member 12b when the reel frame 5 is formed by the above mentioned forging operation.

Figure 4:
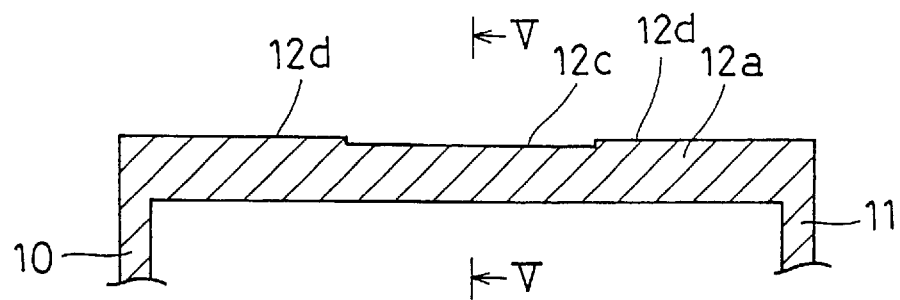
FIG. 4 is a fragmentary cross-sectional view of a reel frame of the reel body depicted in FIG. 3.
Figure 5:
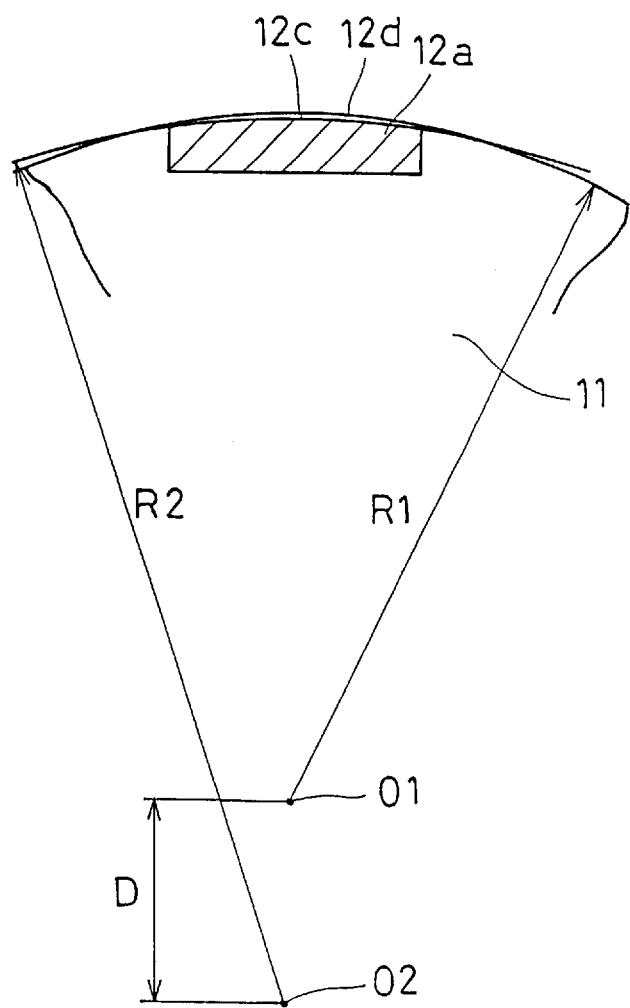
FIG. 5 is a cross-sectional view cut through V—V line shown in FIG. 4.

In FIGS. 3, 4 and 5, the outer surface of the upper connecting member 12a is depicted after being subjected to cutting work using a lathe. On the outer periphery surfaces of the connecting member 12a, a middle portion 12c is formed. The middle portion 12c extends perpendicular to the axial length of the spool 15 and the lower connecting member 12b. The middle portion 12c extends generally parallel to the fishing rod installation portion 4 and perpendicular to the length of the connecting member 12a. The middle portion 12c has an arcuate shape with a radius R2 having a center at a second centering axis 02 that is located beneath the first centering axis 01. The middle portion 12c is formed by being subjected cutting work using, for instance, a lathe. On the other hand, the two side portions 12d are, provided with an arcuate shape corresponding to the outer circumference of the side plates 10 and 11 having a radius R1 with a center aligned with the first centering axis 01. The side portions 12d of the connecting member 12a are shaped by being subjected to cutting work using, for example, a lathe. At the connecting member 12a, the distance between the arcs having radii R1 and R2 is very small compared to a distance D between the first centering axis 01 and the second centering axis 02. Further, as can be seen in FIG. 5 at the intersection of the arc defined by R1 and the arc defined by R2, the difference in length between R1 and R2 is less than a distance D between the first and second centering axis 01 and 02. Therefore, lathe cutting work performed on the connecting member 12a removes a small amount of material forming the middle portion 12c, producing an attractive appearance to the connecting member 12a. It is therefore possible to reduce the difference between the surface of the side portions 12d formed by lathe cutting work about the first centering axis 01 at radius R1 and the surface of the middle portion 12c formed by lathe cutting work about the second centering axis 02. Accordingly, the difference in level of the arcs is hardly noticeable if the side plates 10 and 11 are connected by the connecting member 12a at an upper portion of the reel body 1.

In the depicted embodiment, the middle portion 12c provided is subjected to cutting work to form an arcuate contour having a center at the second centering axis 02, where the second centering axis 02 is located closer to the fishing rod installation portion 4 than the first centering axis 01. Thus, it is possible to position most of the fishing rod installation portion 4 between the sides 10 and 11 and dispose the fishing rod installation portion 4 completely within the radius R2 having a center that coincides with the second centering axis 02. For this reason, it is possible to form the fishing rod installation portion 4 integrally with the connecting member 12b and subject the outer periphery surface of the connecting member 12a to cutting work. Because the fishing rod installation portion 4 is integrally formed with the connecting member 12b, it is possible to maintain strength and reduce the thickness and weight of the connection between the installation portion 5 and the reel frame 5 (the joint portion), as compared to prior art configurations in which a separate member is used in a joint portion connected to a connecting member. By the configuration of the present invention, it is possible to provide the reel with a low profile thereby bringing the spool 15 closer to the fishing rod. Moreover, the present invention makes it possible to provide a reel with a more appealing and high-class appearance because the fishing rod installation portion 4 of the reel is integrally formed with the reel frame 5 and the outer surface of the connecting member 12a can be subjected to cutting work.

Further, when the side plates 10 and 11 and a plurality of the connecting members 12a and 12b are integrally formed in, for instance, a forging process, deformation such as bending is less likely in the event that a large impacting force is applied to the reel body 1. Hence, reductions in wind-up efficiency may be avoided.

The first side cover 13 is a plate-like member and is formed, for example, by die casting an aluminum alloy. A bearing accommodating portion 13a, which protrudes inwardly relative to the reel frame 5, is formed at a location that is offset in an upwardly direction from the center of the first side cover 13, as shown in FIG. 3. It should be understood that the center of the first side cover 13 coincides with the second centering axis 02 shown in FIG. 5. Bearings (not shown) for rotatably supporting the spool shaft 16 of the spool 15 are inserted into the bearing accommodating portion 13a. Three machine screw holes 13b are provided on the inner periphery side of the first side cover 13. Each of the three machine screw holes 13b is aligned with a corresponding one of the screw holes 10b. The first side cover 13 is fixed to the reel frame 5 by three screws (not shown), each of which is inserted in respective machine screw holes 13b and threaded into a respective screw hole 10b.

The second cover 14 made of a thin metal plate made of, for instance, an aluminum alloy that has been pressed into shape (deformed by pressing). The second cover 14 is a circular plate-like member which is substantially the same size as the side plate 11 when viewed from the side direction thereof. As mentioned above, the rotation transmitting mechanism (not shown) is disposed in a space defined between the second cover 14 and the side plate 11. Three machine screw holes 14a are formed on the periphery portion of the second cover 14. Each of the three machine screw holes 14a extends through the side plate 11 and is aligned with a corresponding screw hole 11b in the side plate 11. The second cover 14 is fixed to the reel frame 5 by three screws (not shown), each of which is inserted in the respective machine screw hole 14a and threaded into a respective screw hole 11b.

As shown in FIGS. 1 and 2, a clutch lever 20 is disposed at a rear portion of the reel body 1 so as to be changeable from an upper position to a lower position. The clutch lever 20 is provided in order to operate a clutch mechanism (not shown) located in the rotation transmitting mechanism (not shown). When the clutch lever 20 is pressed downwardly, the clutch mechanism may be turned off so that the spool 15 may freely rotate.

A level wind mechanism 21 is disposed at a front portion of the reel body 1. The level wind mechanism 21 reciprocates in along an axis that is generally parallel to the rotational axis of the spool 15. The level winding mechanism 21 is mechanically coupled to the handle 2 such that the level winding mechanism 21 reciprocates in response to rotation of the handle 2. In this manner, a fishing line may be uniformly wound around the spool 15.

Next, the operation of a reel when the double bearing reel is used will be explained.

When it is desired to release a fishing line, the clutch lever 20 may be pressed down so that the clutch mechanism (not shown) enters a clutch-off state. By this operation, the spool 15 enters a free rotation state. While maintaining this state, person fishing may perform a casting operation using his/her right hand so that the spool 15 may be rotated in the line-releasing direction by the weight of a lure or other weight and the fishing line is drawn off of the spool 15. After the casting operation, he/she may pass the fishing rod from his/her right hand to left hand and grasp the fishing rod together with the reel using his/her palm, i.e., by palming. At this time, since the reel body 1 has a low profile, it is easy to perform the palming operation. When the lure hits the water, the handle 2 may be immediately rotated in the line-winding direction using his/her right hand to start a retrieving or winding operation to wind the fishing line in a desired amount. When the handle 2 is rotated in the line-winding direction, the clutch (not shown) enters a clutch-on state by a clutch returning mechanism (not shown) and the spool 15 may be rotated in the line-winding direction.

Since the fishing rod installation portion 4 is integrally formed with the connecting member 12b in, for instance, a forging process or the like, it becomes possible, while maintaining the strength, to reduce the thickness and weight of the joint portion as compared with a case in which the fishing rod installation portion 4 is joined by caulking or using screws. Accordingly, a distance between the fishing rod, to which the fishing rod installation portion 4 is attached, and the upper portion of the reel body 1 may be reduced to realize a low profile of the reel body 1.

It should be understood that in prior art configurations, the joint portion referred to above is the joining of two separate members in order to facilitate mounting of a reel on a fishing rod. Specifically, in the prior art a rod mounting member is bolted, welded or otherwise fixed to a support member of a reel frame. However, in the present invention, the installation portion is integrally formed (forged) as a part of the connecting member 12b of the reel frame 5. Therefore, there is no joint portion in the present invention, when compared to the structure of the prior art configurations.

Further, in the present invention, the low profile achieved by the configuration of the reel frame 5 whereby the installation portion 4 is confined within a cylindrical shaped space having a radius R2 centered on the second centering axis 02. Further, the majority of the installation portion 4 is confined within a cylindrically shaped space defined between side plates 10 and 11 of the reel frame 5 having a radius R1 centered on the first centering axis 01. In other words, only small end portions the installation portion 4 extend outside the cylindrically shaped space defined between the side plates 10 and 11 and none of the installation portion 4 extends outside the cylindrically shaped space defined by the radius R2 centered on the first centering axis 02. The installation portion 4 may therefore be closer to the axis of rotation of the spool 15 compared to prior art configurations reducing the force applied to the installation portion 4 during line winding of the spool 15 when there is tension on the fishing line.

Alternate Embodiments (a) Although only the middle portion 12c in the axial direction of the outer surface of the connecting member 12a is subjected to a cutting work so as to be a circular shape using the second centering axis 02 as the rotational center in the above-mentioned embodiment, the entire outer surface of the connecting member 12a may be subjected to a cutting work so as to be a circular shape using the second centering axis 02 as the rotational center.

(b) Although only the middle portion 12c in the axial direction of the outer surface of the connecting member 12a is subjected to a cutting work so as to be a circular shape using the second centering axis 02 as the rotational center in the above-mentioned embodiment, the whole surface including the surface of the connecting member 12a may be subjected to a cutting work so as to be a circular shape using the second centering axis 02 as the rotational center after subjecting the outer surfaces of the side plates 10 and 11 to a cutting work so as to be a circular shape using the first centering axis 01 as the rotational center.

(c) Although the first side cover 13 is not formed together with the side plate 10 in the above-mentioned embodiment, the first side cover 13 may be integrally formed with the side plate 10.

Effect of the Invention

According to the present invention, the middle portion 12c, which is located at a position above and aligned with the fishing rod installation portion 4, is subjected to a cutting work so as have an arcuate shape having a radius R2 centered at the second centering axis 02. Further, it is possible to position the fishing rod installation portion 4 within a cylindrically shaped space defined by the radius R2 centered at the second centering axis 02. For this reason, it is possible to form the fishing rod installation portion 4 integrally with the connecting member 12b and subject the outer surface of the connecting member 12a to cutting work. Because the fishing rod installation portion 4 is integrally formed with the connecting member 12b, it is possible, while maintaining the strength, to reduce the thickness and weight of the joint portion (the connecting member 12b and the installation portion 4) as compared to prior art configurations where a separate member attached to a connecting member with a joint therebetween, and a achieve a reel having a low profile. Moreover, it becomes easy to obtain a high-class appearance since the fishing rod installation portion 4 is integrally formed with the connecting member 12b and subject the outer surface of the connecting member 12a to cutting work to improve its appearance.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A reel body of a double bearing reel for attachment to a fishing rod, the reel body supporting a spool that is rotatable about a rotational axis for winding a fishing line, the rotational axis being generally perpendicular to a longitudinal length of the fishing rod, the reel body comprising:
   a pair of side plates, said side plates having a generally circular shape having a radius R1 about a first centering axis that is offset from the rotational axis;
   a plurality of connecting members rigidly connected to said side plates, said connecting members being spaced apart from one another such that the spool is positionable between said side plates; and
   a fishing rod installation portion extending in a direction generally perpendicular to the rotational axis, said fishing rod installation portion being formed integrally with a portion of one of said plurality of connecting members;
   wherein an outer surface of at least one of the remaining connecting members has a radial outer surface having at least a portion thereof formed with an arcuate shape the arcuate shape of said portion having a radius R2 about a second centering axis that is parallel to said first centering axis, said second centering axis being located closer to said fishing rod installation portion than said first centering axis, said rod installation portion being located completely within a cylindrical space defined by the radius R2 about the second centering axis.

2. A reel body as set forth in claim 1, wherein a difference in length between radius R1 and radius R2 is smaller than the distance between the first centering axis and the second centering axis.

3. A reel body as set forth in claim 2, further comprising:
   a pair of side covers for covering the outside of said side plates.

4. A reel body as set forth in claim 3, wherein said side covers each have a circular shape having a radius of R1.

5. A reel body as set forth in claim 4, wherein said rod installation portion and said one of said plurality of connecting members are spaced apart from a lower radial outer edge of said side plates such that the fishing rod extends within a cylindrical space defined between said side plates when attached to said rod installation portion.

* * * * *